United States Patent [19]
Freitag et al.

[11] Patent Number: 5,640,667
[45] Date of Patent: Jun. 17, 1997

[54] LASER-DIRECTED FABRICATION OF FULL-DENSITY METAL ARTICLES USING HOT ISOSTATIC PROCESSING

[75] Inventors: Douglas W. Freitag, Brookeville, Md.; Joseph J. Beaman; David L. Bourell, both of Austin, Tex.

[73] Assignee: Board of Regents, The University of Texas System, Austin, Tex.

[21] Appl. No.: 563,220

[22] Filed: Nov. 27, 1995

[51] Int. Cl.⁶ ............................................. B22F 1/00
[52] U.S. Cl. ........................... 419/31; 419/38; 419/55
[58] Field of Search ........................ 419/30, 38, 31, 419/53, 55

[56] References Cited

U.S. PATENT DOCUMENTS

| | | | |
|---|---|---|---|
| 4,247,508 | 1/1981 | Housholder | 264/219 |
| 4,587,096 | 5/1986 | Mankins et al. | 419/27 |
| 4,863,538 | 9/1989 | Deckard | 156/62.2 |
| 4,944,817 | 7/1990 | Bourell et al. | 156/62.2 |
| 5,017,753 | 5/1991 | Deckard | 219/121.63 |
| 5,076,869 | 12/1991 | Bourell et al. | 156/62.2 |
| 5,156,697 | 10/1992 | Bourelle et al. | 156/62.2 |
| 5,284,695 | 2/1994 | Barlow et al. | 428/206 |
| 5,352,405 | 10/1994 | Beaman et al. | 419/45 |
| 5,393,482 | 2/1995 | Benda et al. | 419/1 |
| 5,427,733 | 6/1995 | Benda et al. | 419/1 |

FOREIGN PATENT DOCUMENTS 61-52373  3/1986  Japan.

OTHER PUBLICATIONS

Klocke, et al. "Rapid Metal Prototyping and Tooling", EARP–Newsletter, vol. 6 (Jul. 1995).
Zimmerman, et al. "Hot Isostatic Pressing: Processes and Equipment", *Isostatic Pressing Technology*, P.J. James, ed. (Elsevier, 1993), pp. 169–201.

*Primary Examiner*—Charles T. Jordan
*Assistant Examiner*—Anthony R. Chi
*Attorney, Agent, or Firm*—Anderson, Levine & Lintel

[57] ABSTRACT

A method of fabricating a fully-dense three-dimensional metal article is disclosed. According to a first embodiment of the invention, the interior portion of the article is formed by way of selective laser sintering, in a cross-section of a layer of powder. After formation of the layer of powder, the laser is directed to form a gas-impervious skin around the interior portion of the article in that layer. The process is repeated, until the article is completed. The article surrounded by the skin is then subjected to hot isostatic pressing to densify the article; the skin, which serves as the "can" for the hot isostatic pressing, may or may not be removed from the article, as desired. According to a second embodiment of the invention, the can is formed first by way of laser generation, and is then filled with the metal powder, prior to hot isostatic pressing.

22 Claims, 6 Drawing Sheets

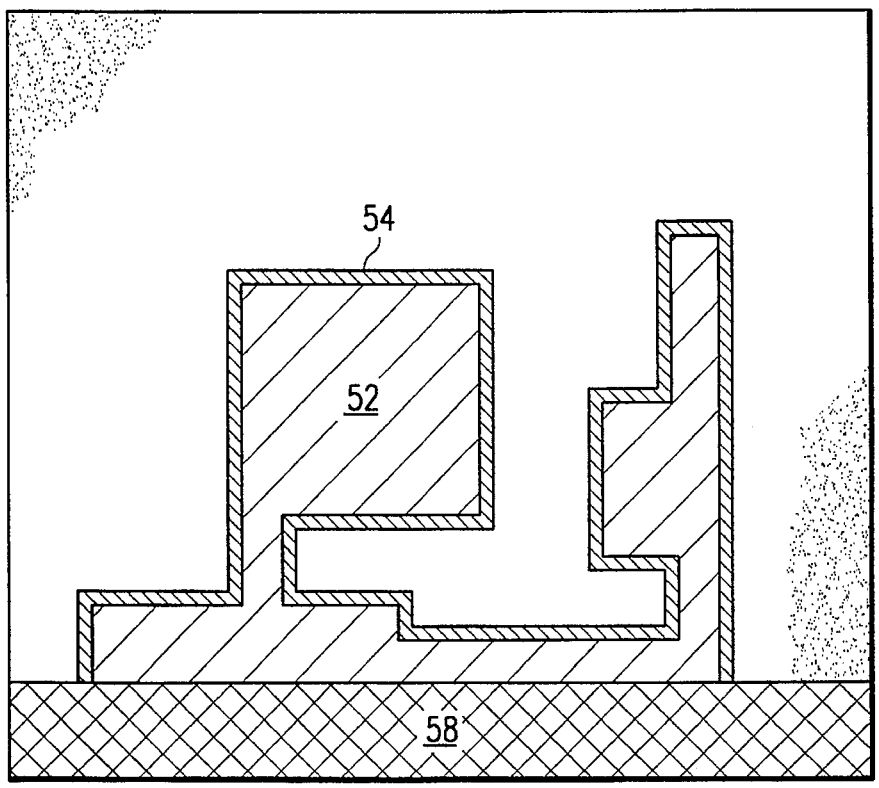
*FIG. 7*
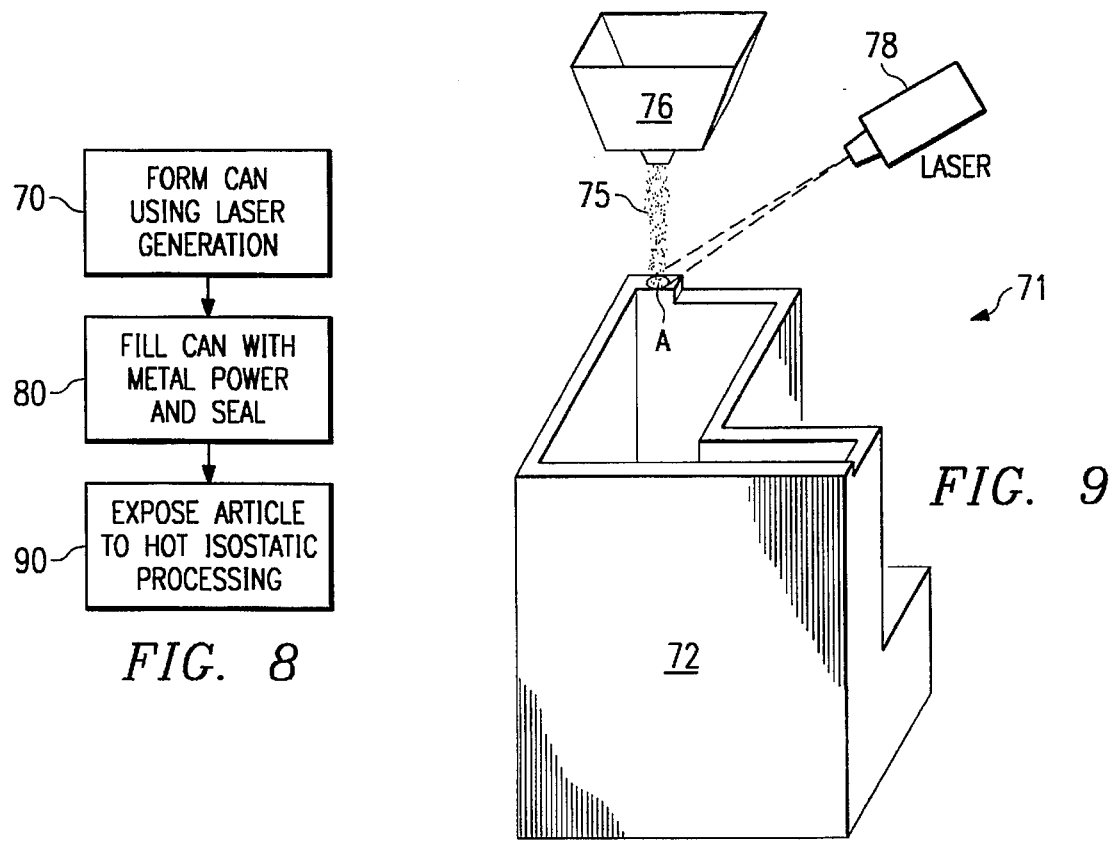
*FIG. 8*
*FIG. 9*

LASER-DIRECTED FABRICATION OF FULL-DENSITY METAL ARTICLES USING HOT ISOSTATIC PROCESSING

This invention is in the field of the manufacturing of solid three-dimensional articles, and is more specifically directed to the additive fabrication of metal articles such as parts and mold dies.

BACKGROUND OF THE INVENTION

The field of free-form fabrication has seen many important recent advances in the fabrication of articles directly from computer-aided design (CAD) data bases. These advances, many of which are in the field of rapid prototyping of articles such as prototype parts and mold dies, have greatly reduced the time and expense required to fabricate articles, particularly in contrast to conventional machining processes in which a block of material, such as a metal, is machined according to engineering drawings. The time required to produce prototype parts from engineering designs has reduced from several weeks, using conventional machinery, to a matter of a few hours. In addition, the complexity and accuracy of the articles which may now be fabricated according to these new technologies is much improved over that available from conventional machining.

One example of a modern rapid prototyping technology is the selective laser sintering process practiced by systems available from DTM Corporation of Austin, Tex. According to this technology, articles are produced in layerwise fashion from a laser-fusible powder that is dispensed one layer at a time. The powder is fused, or sintered, by the application of laser energy that is directed in raster scan fashion to portions of the powder layer corresponding to a cross-section of the article. After the fusing of powder in each layer, an additional layer of powder is then dispensed, and the process repeated, with fused portions of later layers fusing to fused portions of previous layers (as appropriate for the article), until the article is complete. Detailed description of the selective laser sintering technology may be found in U.S. Pat. No. 4,863,538, U.S. Pat. No. 5,017,753, U.S. Pat. No. 5,076,869, and U.S. Pat. No. 4,944,817, all assigned to Board of Regents, The University of Texas System and incorporated herein by this reference, and in U.S. Pat. No. 4,247,508 and U.S. Pat. No. 5,352,405, both assigned to DTM Corporation and incorporated herein by this reference. The selective laser sintering technology has enabled the direct manufacture of three-dimensional articles of high resolution and dimensional accuracy from a variety of materials including wax, polycarbonate, nylon, other plastics, and composite materials such as polymer coated metals and ceramics. Wax parts may be used in the generation of tooling by way of the well-known "lost wax" process. Examples of composite powder materials are described in U.S. Pat. No. 4,944,817, U.S. Pat. No. 5,156,697, and in U.S. Pat. No. 5,284,695, all assigned to Board of Regents, The University of Texas System and incorporated herein by this reference.

The field of rapid prototyping of parts has, in recent years, made large improvements in providing high strength, high density, parts for use in the design and pilot production of many useful articles, including metal parts. These advances have permitted the selective laser sintering process to now also be used in fabricating prototype tooling for injection molding, with expected tool life in excess of ten thousand mold cycles.

The production of metal parts by selective laser sintering conventionally uses a powder of metal particles coated with a polymer, from which a "green" part is fabricated by selective laser sintering of the polymer coating to binds the particles to one another. The green part is then heated to a temperature above the decomposition temperature of the polymer, which both drives off the polymer and also binds the metal substrate particles to one another to form the metal article. In the case where the article is a mold die for injection molding, the die is also impregnated with another metal, for example copper, to add strength, wear resistance, and tooling life. According to another conventional approach, composite polymer-metal parts or tooling may be formed without subjecting the green part to a post-process anneal. In this technique, the green parts formed by the selective laser sintering of a polymer-coated metal powder are impregnated with a liquid resin. The resin is cross-linked, either at room temperature or at an elevated temperature, depending upon the resin chemistry, resulting in near-fully dense composite articles.

The selective laser sintering technology has also been applied to the direct fabrication of articles, such as molds, from metal powders without a binder. Examples of metal powder reportedly used in such direct fabrication include two-phase metal powders of the copper-tin, copper-solder (the solder being 70% lead and 30% tin), and bronze-nickel systems.

The metal articles formed by selective laser sintering in these ways have been quite dense, for example having densities of up to 70–80% of fully dense (prior to any infiltration). However, some porosity still remains in these metal articles, thus limiting their structural strength and thus the utility of the articles. For example, the less-than-fully dense articles so fabricated, even when subsequently infiltrated by a molten metal, will not have the same length of life, when used as injection mold dies, as will machined dies from solid metal substrates. Such articles are also not useful as actual working parts in machinery, in comparison to machined parts.

It has been observed that the direct selective laser sintering of metal to produce a metal, fully-dense, article encounters many significant technical barriers. Firstly, since the melting, or sintering, temperature of metals is typically very high, the laser power required to fuse the metal into a fully-dense article is also very high. Secondly, the laser fusing of a large area of a metal powder layer into a mass necessarily presents very large thermal gradients in the selective laser sintering system, greatly improving the likelihood of distortion of the part due to thermal effects such as curling and growth. While these gradients may be reduced by raising of the ambient temperature of the selective laser sintering chamber to near the sintering temperature of the metal powder, this unfortunately causes caking of the powder as it is dispensed into the chamber, further limiting the ability of this technology to directly produce fully-dense metal articles.

By way of further background, another laser-based rapid prototyping method is described in Klocke, et al., "Rapid Metal Prototyping and Tooling", *EARP-Newsletter*, Vol. 6, (July 1995) and is referred to as "laser generating". According to this technique, the powder is not dispensed in a layer-wise fashion as in the case of selective laser sintering, but is instead fed into the melting pool produced by the location at which the laser is focused. The fed powder is then bonded to the article at that point, with additional powder fed thereto to further build up the article. The Klocke et al. article indicates that thin-walled articles have been formed from metal powders (iron and cobalt base metals) using the laser generating technology.

By way of further background, the use of hot isostatic pressing (HIP) to form metal articles is well known. According to this technique, a porous metal article is surrounded by a machined gas-impervious shell, or "can", also preferably formed of a metal. Alternatively, a can may be filled with a metal powder that is not previously formed into a shape. The article in the can is placed into a pressure vessel within a furnace. The HIP process elevates the temperature of the workpiece to a sufficient temperature so that the metal reaches a softened state, while pressurizing the workpiece with an inert gas. The pressure exuded by the gas is isostatic, and exerts an equal force in all directions against the gas-impervious shell. The softened metal of the workpiece (and can) is thus isotropically squeezed, eliminating any porosity in the article. A fully-dense metal article, with some minimal amount of shrinkage from its pre-HIP state, thus results from the HIP processing. The can is then conventionally removed from the article, for example by machining or by etching. However, as is well-known in the HIP field, the fabrication of the "can" is generally quite difficult, when accomplished by conventional techniques such as machining. As such, the dimensional resolution and shape-complexity of the articles produced by HIP processes are typically limited.

It is therefore an object of the present invention to provide a method of fabricating fully-dense metal articles in a way which takes advantages of the resolution and object complexity enabled by selective laser sintering.

It is a further object of the present invention to provide such a method in which HIP-processed articles may be fabricated, as fully-dense articles, but with improved accuracy and increased complexity relative to conventional HIP articles.

It is a further object of the present invention to provide such a method in which the articles may be formed and subjected to HIP processing, but where the "can" is formed of the same material as the underlying article, and may be left on the article after fabrication is completed.

It is a further object of the present invention to provide such a method in which fully-dense metal articles may be produced with the complexity and accuracy of laser-directed processes, from a wide range of metal materials.

Other objects and advantages of the present invention will be apparent to those of ordinary skill in the art having reference to the following specification together with its drawings.

SUMMARY OF THE INVENTION

The invention may be implemented into a process of fabricating an article in which laser directed techniques are used to produce a metal article surrounded by a gas-impervious skin, preferably of the same metal material. The article is fabricated, in the example of selective laser sintering, by scanning the skin portion of the article in each layer of metal powder with increased laser power or reduced scan speed, so that the density of the sintered portion of the laser in the skin is much increased from that of the article being formed while minimizing the thermal gradients in the system. The article is formed in layer-wise fashion and, after removal from the surrounding unfused metal powder, is then subjected to a conventional hot isostatic pressing (HIP) process to densify the article. The gas-impervious skin in the selective laser sintered article serves as the "can" in the HIP process, and may either be removed by machining after densification or may remain as the outer layer of the article.

BRIEF DESCRIPTION OF THE DRAWINGS

FIGS. 6 and 7 are cross-sectional elevation views of an article being formed in the selective laser sintering apparatus of FIG. 2a according to alternative embodiments of the invention.

FIG. 8 is flow chart illustrating the process steps in fabricating a fully-dense article according to an alternative embodiment of the invention.

FIG. 9 is a perspective schematic view of a system for fabricating the article according to the alternative embodiment of the invention shown in FIG. 8.

DETAILED DESCRIPTION OF THE PREFERRED EMBODIMENT

Figure 1:
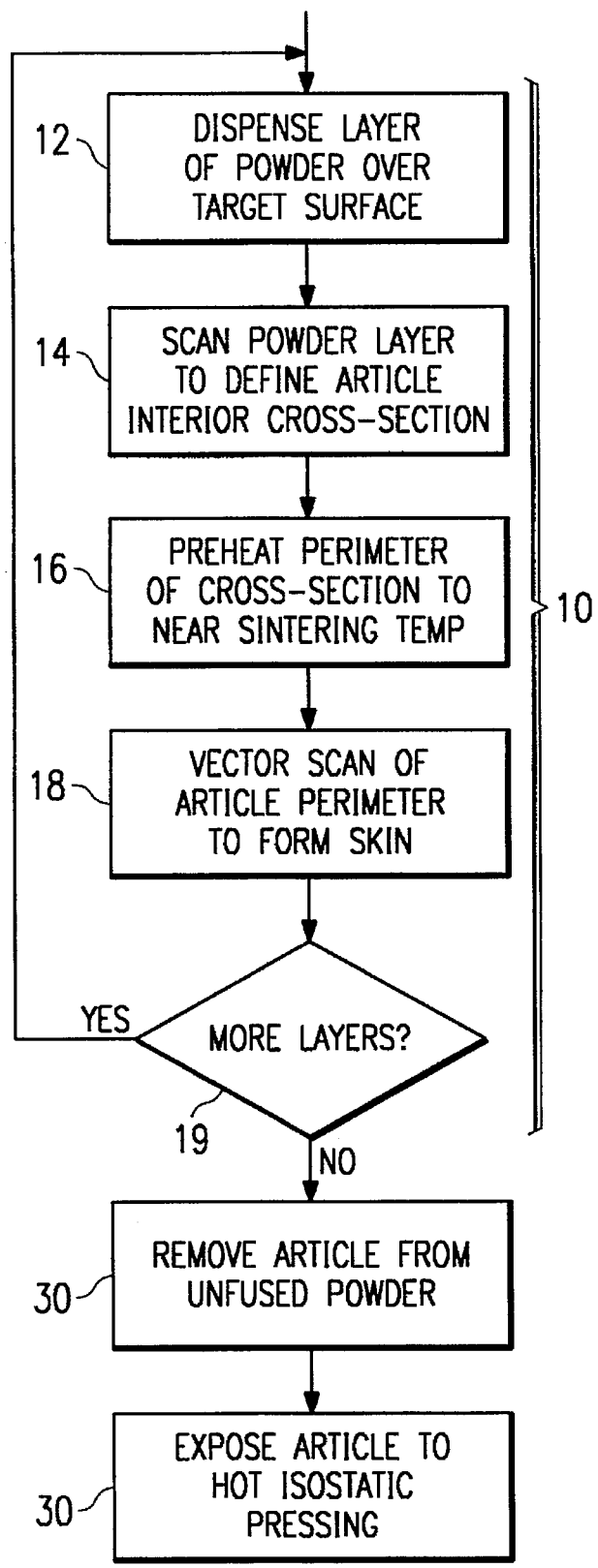
FIG. 1 is a flow chart illustrating the process steps in fabricating a fully-dense article according to the preferred embodiment of the invention.

Referring now to FIG. 1, a method of fabricating articles according to a first preferred embodiment of the invention will now be described in detail. According to this preferred embodiment of the invention, the method begins with process 10, in which a three-dimensional metal article is fabricated by the selective laser sintering of a metal powder in such a manner that a gas-impervious skin surrounds the body of the article, where the skin serves as the "can" in a subsequent hot isostatic pressing process.

Figure 2A:
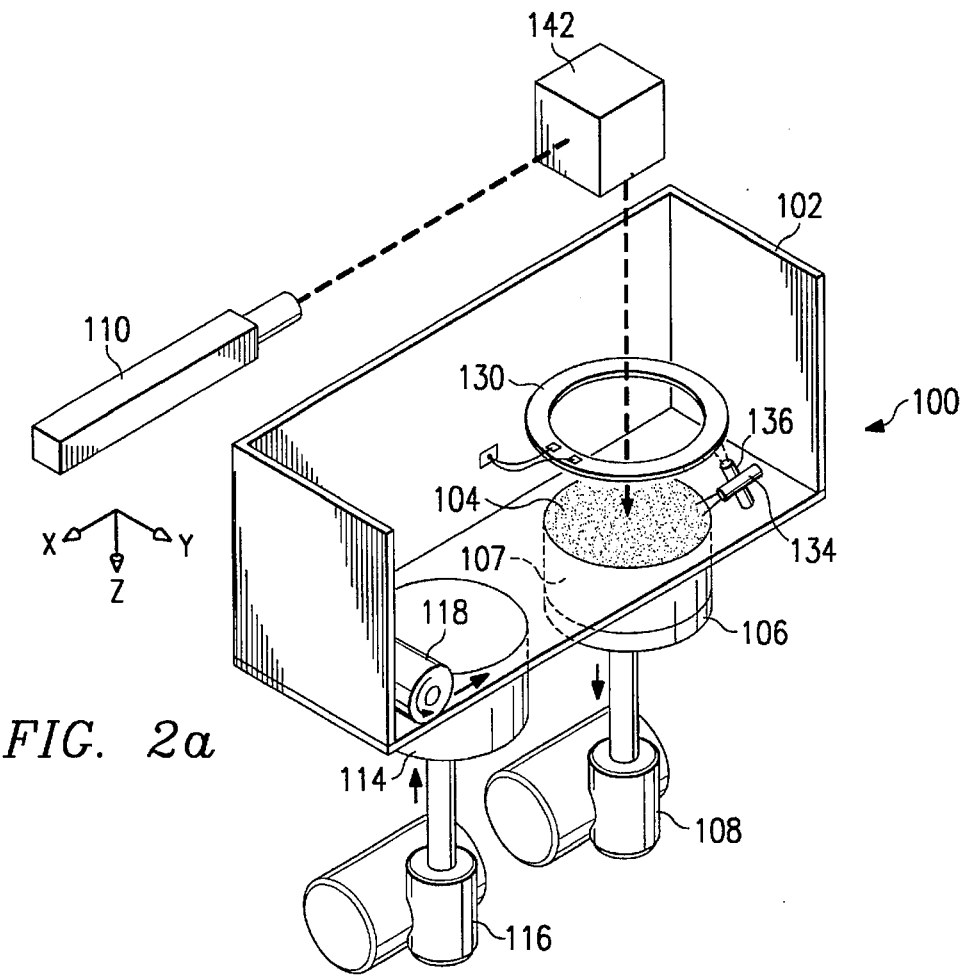
FIGS. 2a and 2b are perspective cutaway and schematic views of a selective laser sintering system useful in preparing the near-fully dense article and can according to the preferred embodiment of the invention.
Figure 2B:
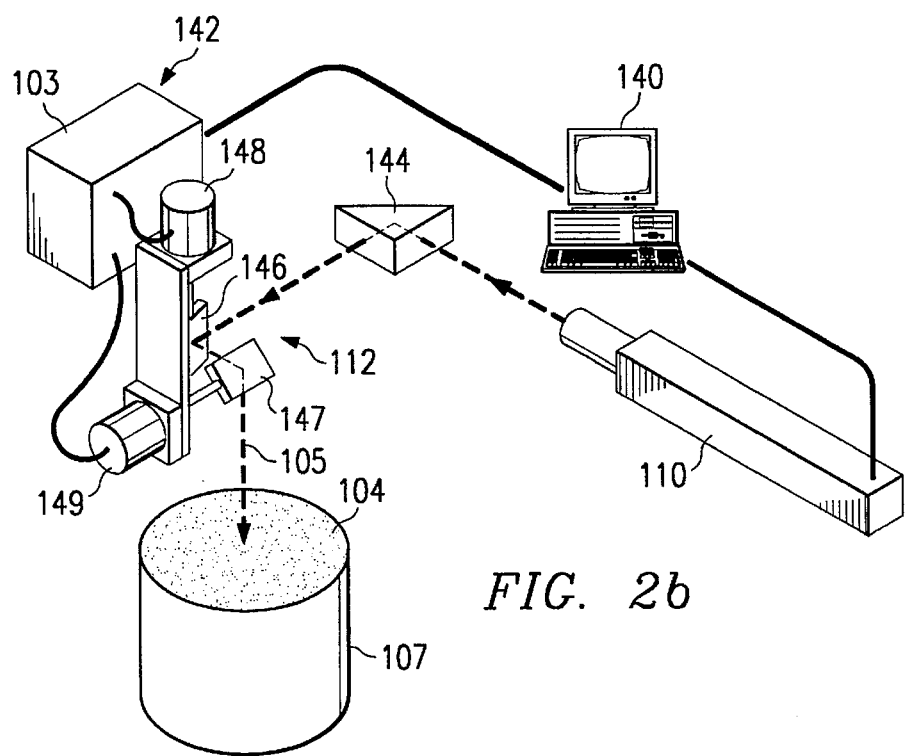

As shown in FIG. 1, and as described hereinabove in the Background of the Invention, selective laser sintering process 10 includes a series of steps that are repetitively performed to fabricate the body of the article surrounded by an integrally-formed gas-impervious skin. Process 10 is preferably performed in a selective laser sintering system, such as the SINTERSTATION 2000 system available from DTM Corporation, in which the various steps of process 10 are effected in a single process chamber. Referring now to FIGS. 2a and 2b, the construction of a selective laser sintering system 100 will be described, for purposes of explanation of this preferred embodiment of the present invention.

As shown in FIG. 2a, selective laser sintering system 100 includes a chamber 102 (front doors and the top of chamber 102 not shown in FIG. 2a, for purposes of clarity) within which selective laser sintering process 10 takes place. Target surface 104, for purposes of the description herein, refers to the top surface of heat-fusible powder (including portions previously sintered, if present) disposed on part piston 106; the sintered and unsintered powder disposed on part piston 6 will be referred to herein as part bed 107. The vertical motion of part piston 106 is controlled by motor 108. Laser 110 provides a beam which is directed by scanning system 142 in the manner described in the U.S. Patents referred to hereinabove and as shown in FIG. 2b.

FIG. 2b illustrates laser 110 and scanning system 142. Laser 110 includes, in addition to a laser itself, such conventional control elements as described in the above-referenced U.S. Pat. No. 4,863,538, for example a safety shutter, a front mirror assembly, and focusing elements such as diverging and converging lenses. The type of laser 110 used is, of course, dependent upon many factors and in particular upon the type of powder that is to be sintered. For metal powders such as used according to this embodiment of the invention, a preferred laser is a 150 watt Nd/YAG type laser, preferably with controllable power output. Laser 110 is preferably controllable to be modulated on and off; while on, laser 110 produces laser beam 105 which travels generally along the path shown by the arrows in FIG. 2b.

Computer 140 and scanning system 142 are also included for controlling the direction of the laser beam as it impinges target surface 104. In this preferred embodiment of the invention, computer 140 includes a microprocessor for controlling laser 110 and further includes a CAD/CAM system for generating the data that defines the dimensions of the article being produced. A conventional personal computer workstation, such as a personal computer based on a Pentium-class microprocessor and including floating point capabilities, is suitable for use as computer 140 in the preferred embodiment of the invention.

Scanning system 142 includes prism 144 for redirecting the path of travel of laser beam 105; the number of prisms 144 necessary for directing laser beam 105 to the proper location is based on the physical layout of the apparatus. Alternatively, as is well known in the art, one or more fixed mirrors can be used in place of prism 144 for directing laser beam 105, depending upon the particular layout of system 100. Scanning system 142 further includes a pair of mirrors 146, 147 which are driven by respective galvanometers 148, 149. Galvanometers 148, 149 are coupled to their respective mirrors 146, 147 to selectively orient the mirrors 146, 147 and control the aim of laser beam 105. Galvanometers 148, 149 are mounted perpendicularly to one another so that mirrors 146, 147 are mounted nominally at a right angle relative to one another. A function generator driver in scanning system 142 controls the movement of galvanometers 148, 149 to control the aim of laser beam 105 within target surface 104, in conjunction with its on and off modulation controlled by computer 140, according to CAD/CAM data stored within computer 140 that defines the cross-section of the article to be formed in the layer of powder at target surface 104. It is contemplated, of course, that alternative scanning systems may be used in place of scanning system 142 described hereinabove, including such apparatus as acoustic-optic scanners, rotating polygonal mirrors, and resonant mirror scanners.

Referring back to FIG. 2a, delivery of the metal heat-fusible powder is accomplished in system 100 by way of powder, or feed, piston 114, controlled by motor 116, in combination with counter-rotating roller 118. As described in U.S. Pat. No. 5,017,753 incorporated hereinabove, counter-rotating roller 118 transfers the powder lifted above the floor of chamber 102 to target surface 104 in a uniform and level fashion. It may be preferred to provide two powder pistons 114 on either side of part piston 106, for purposes of efficient and flexible powder deliver, as used in the SINTERSTATION 2000 system available from DTM Corporation.

In operation, selective laser sintering process 10 begins by system 100 performing process 12 to dispense a layer of metal powder over target surface 104. In system 100, powder is delivered by feed piston 114 moving upwardly to place a volume of powder into chamber 102. Roller 118 (preferably provided with a scraper to prevent buildup, such scraper not shown in FIG. 2a for clarity) spreads the powder within chamber 102 and over target surface 104 by its translation from feed piston 114 toward and across target surface 104 at the surface of part bed 107 above part piston 106, in the manner described in the above-incorporated U.S. Pat. No. 5,017,753. At the time that roller 118 is providing powder from feed piston 114, target surface 104 (whether or not a prior layer is disposed thereat) is preferably below the floor of chamber 102 by a small amount, for example 5 mils, to define the thickness of the laser of powder to now be processed. It is preferable, for smooth and thorough distribution of the powder, that the amount of powder provided by feed piston 114 be greater than that which can be accepted by part piston 106, so that some excess powder will result from the motion of roller 118 across target surface 104; this may be accomplished by the raising of feed piston 114 above the floor of chamber 102 by a greater distance that the distance below the floor of chamber 102 that part piston 106 is lowered (e.g., 10 mils versus 5 mils). It is also preferable to slave the counter-rotation of roller 118 to the translation of roller 118 within chamber 102, so that the ratio of rotational speed to translation speed is constant.

Target surface 104 is typically a previously dispensed layer of powder, whether or not portions of the article have been formed therein; alternatively, as will be described in further detail hereinbelow, target surface 104 may be a solid substrate that is in place in part piston 106 and upon which the article will be formed. According to this embodiment of the invention, the powder dispensed in process 12 is a metal powder of the material from which the eventual fully-dense article is to be fabricated. It is contemplated that the powder useful according to this embodiment of the invention may be from a wide range of materials, specific examples of which include powders of superalloys (e.g., InCoNel), carbon steel, stainless steel, copper-steel, nickel-bronze steel, titanium alloys, nickel-based alloys, and mixtures of metals (e.g., a mixture of bronze and nickel powders). It is contemplated that this embodiment of the invention will allow a wide range of metal materials to be used in the fabrication of fully-dense metal articles, due to its minimization of the volume of powder required to be fully sintered.

Figure 3A:
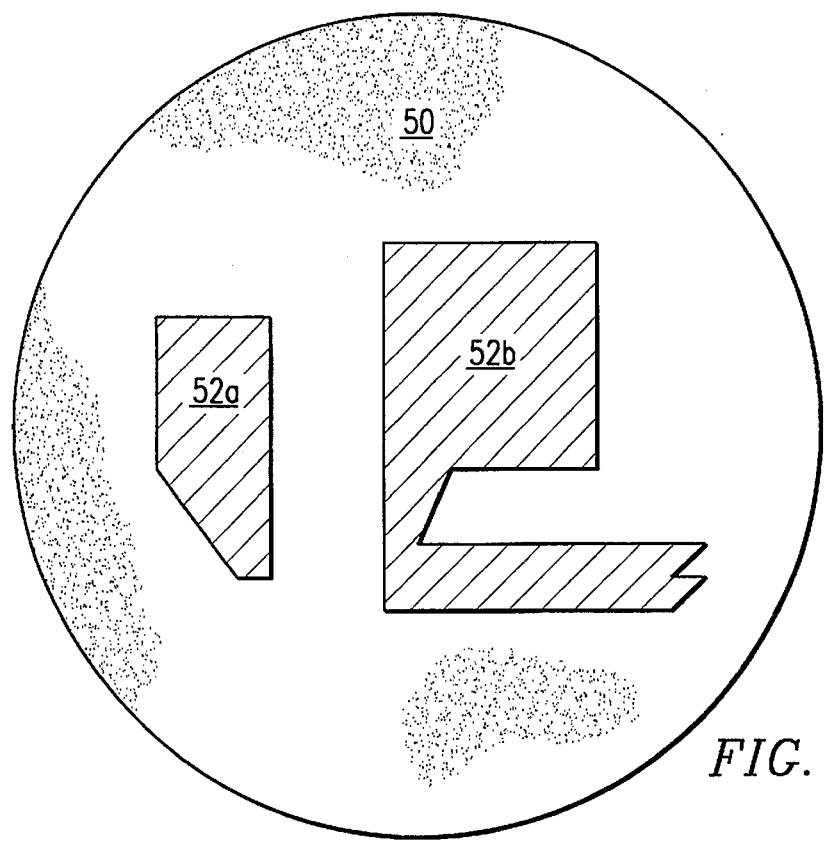
FIGS. 3a, 3b and 3c are cross-sectional elevation and plan views of an article being formed in the selective laser sintering apparatus of FIGS. 2a and 2b according to the preferred embodiment of the invention.

After dispensation of a layer of powder in process 12, process 14 is then performed, by way of which laser beam 105 is scanned over the layer of powder to selectively fuse the portion of the powder corresponding to the interior cross-section of the article to be formed in that layer. FIG. 3a illustrates, in plan view, an exemplary layer 50 of unfused powder in which interior article portions 52a, 52b are formed by way of process 14. As shown in FIG. 3a, the shapes of interior article portions 52a 52b as formed in a particular layer of powder 50 may be relatively complex, due to the ability of laser 110 to accurately define a cross-section of the article based upon the CAD representation thereof.

According to this embodiment of the invention, process 14 is preferably performed in such a manner as to bind the particles of powder in the cross-section to one another, but not to such an extent as to form a fully-dense metal portion thereat. For example, as described in the above-referenced U.S. Pat. No. 5,352,405, interior article portions 52a, 52b may be formed by way of interleaved overlapping or non-overlapping scans of laser beam 105 thereacross in a raster scan fashion, where laser 110 is turned on when focused on interior article portions 52a, 52b and turned off otherwise. Alternatively, laser beam 105 may be directed across interior article portions 52a, 52b in a cross-hatch pattern, where the raster scan is in one direction in a first pass, followed by raster scan in a perpendicular direction in a second pass of the same layer 50 of powder. In any case, it is preferable that interior article portions 52a, 52b be defined and solidified to some extent in process 14, to minimize shrinkage of the eventual article during hot isostatic processing; however, as noted above, interior article portions 52a, 52b should not be defined in a fully-dense state by laser beam 105 in process 14, as the thermal gradients necessary in so fabricating the article will exacerbate distortion of the article. The present invention minimizes such thermal distortion by minimizing the volume of the article that is formed in a dense fashion during selective laser sintering process 10.

It should be noted at this time that selective laser sintering process 10 is preferably performed under conditions in chamber 102 that are not conducive to the oxidation of the metal powder. Prevention of oxidation is particularly crucial if the powder consists of certain metals, such as titanium alloys. To accomplish this, an inert or non-oxidizing atmosphere, such as nitrogen, preferably fills chamber 102 during selective laser sintering process 10.

Following the definition of interior article portions 52a, 52b in process 14, process 16 is now performed by selective laser sintering system 100 to preheat portions of the powder layer 50, including at least the powder at the perimeter of interior article portions 52a, 52b. These portions of the powder at the perimeter of interior article portions 52a, 52b are the locations at which a gas-impervious "skin" will be formed through the operation of selective laser sintering in process 18, and as such will be the locations at which significantly higher laser energy per unit volume (relative to that applied in process 14) will be applied. Various approaches to performing the preheating of process 16 will be described hereinbelow, after the description of process 18 in which the gas-impervious skin is formed.

Figure 3B:
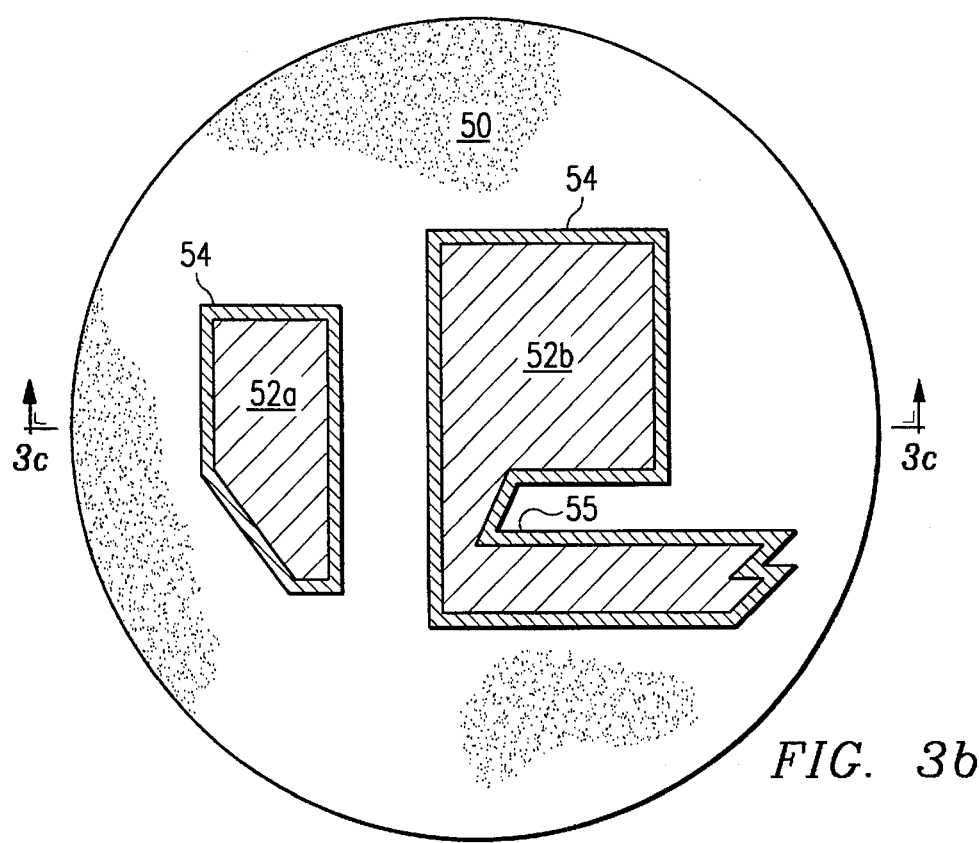

Referring now to FIG. 3b, following or during pre-heating process 16, process 18 is performed in order to form a gas-impervious skin 54 at the perimeter of, and surrounding, interior article portions 52a, 52b in the layer of powder. Process 18 is performed by way of selective laser sintering, as in the case of process 14, but under different conditions than those used in process 14 to form the interior portions. As noted above, it is contemplated that the interior article portions 52a, 52b formed by process 14 will be less than fully-dense, and will thus have some porosity so as to not themselves be gas-impervious. The hot isostatic pressing process (HIP) that is to be subsequently performed according to the present invention requires that the exterior of the article undergoing the HIP process be gas impervious, so that pressurized gas may exert a densifying force upon the interior article 52 via skin 54. Accordingly, skin 54 is formed in process 18 around the perimeter of interior article portions 52a, 52b in layer 50, so as to have higher density than interior article portions 52.

According to the preferred embodiment of the invention, process 18 is preferably performed by directing laser beam 105 in a vector drawing fashion around the perimeter of interior article portions 52, in such a way as to deliver thereat a relatively higher energy per unit volume than used to form interior article portions 52. This increased energy may be applied simply by increasing the laser energy for process 18 relative to that used in process 14, or by reducing the scan speed so that the dwell time of laser beam 105 is greater in forming skin 54 than in forming interior article portions 52. In addition, skin 54 may be formed in process 18 by performing repeated overlapping vector scans of the perimeter of interior article portions 52 (where interior article portions 52 were formed by non-overlapping or cross-hatching raster scans). Any or all of these approaches may be used individually or in combination to form skin 54. The actual difference in energy per unit volume delivered to form skin 54 relative to interior article portions 52 will, of course, depend upon the particular metal material of powder 50. As a result of process 18, therefore, skin 54 is formed as shown in FIG. 3b to surround interior article portions 52, skin 54 being of such density as to be impervious to gas, while still being of the same material as used to form interior article portions 52.

It is contemplated, relative to skin formation process 18, that certain real-time controls of the laser energy may be beneficial in the uniform formation of skin 54, particularly in controlling certain geometry-dependent effects. For example, referring to FIG. 3b, the energy provided to form corner 55 of skin 54 may be excessive, due to is sharpness and thus to the time that laser beam 105 must be present thereat to form skin 54. It may be preferable, in corners such as corner 55 of FIG. 3b, to reduce the energy applied by laser 110 when vector drawing geometries such as corners, to ensure that the laser energy delivered per unit volume of the powder remains substantially uniform. It is contemplated that such control could be maintained by conventional computer control to result in a uniformly thick skin 54 along the entire perimeter of interior article portions 52, with minimal thermal distortion effects.

Referring back to the preheating of process 16, it is contemplated that this process may be performed either prior to or during the formation of skin 54 in an individual layer is preferred according to this embodiment of the invention in order to maintain the laser power as low as possible to effect the fabrication of the gas-impervious skin while still maintaining the powder at a temperature below its caking temperature when dispensed in process 12. As is known in the art, many powders, including those metal powders for which the invention is intended, exhibit some amount of interparticle adherence at temperatures that are well below their sintering temperatures; the threshold temperature of this effect is referred to as the "caking" temperature of the material. In order for maximum resolution in the fabrication of the article according to this embodiment of the invention, it is important that the powder be freely flowable when dispensed in process 12, and thus below the caking temperature. Since the energy required to raise most metal powders from the caking temperature to a temperature at which fully-dense sintering may occur is significant, the pre-heating of the perimeter locations of interior article portions 52a, 52b as performed in process 16 is very useful in allowing conventional lasers 110 to perform the method according to this embodiment of the invention.

Figure 4:
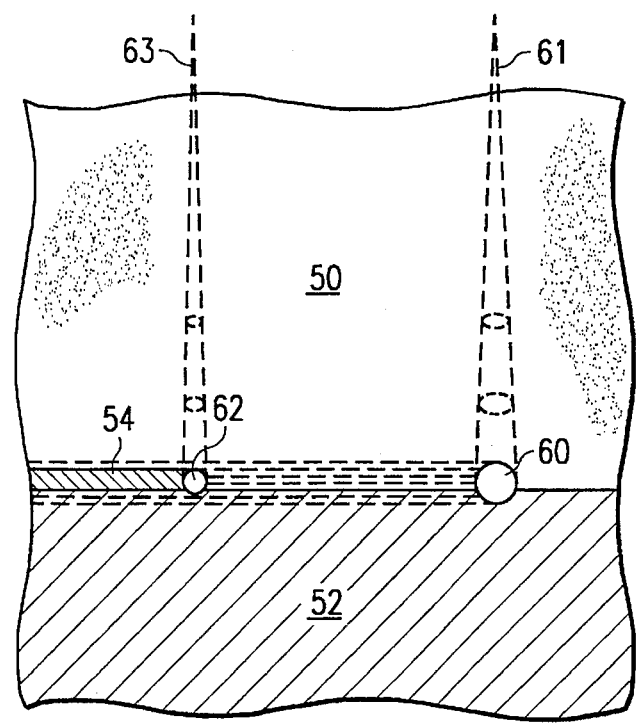
FIG. 4 is a plan view illustrating the operation of a laser-based preheating operation as used in the preferred embodiment of the invention.

According to a first alternative technique for performing process 16, two laser beams are applied to the perimeters of interior article portions 52a, 52b, one in advance of the other. Attention is directed to FIG. 4, in which an example of preheating process 16 is illustrated as being performed simultaneously with process 18. As shown in FIG. 4, a laser beam 61 is applied to the edge of an interior article portion 52, preferably so as to overlap into unfused powder 50 in that layer, and in advance of laser beam 63 which is sintering powder 50 at the edge of interior article 52 to form a gas-impervious skin 54 in the manner described hereinbelow. Beam 61 is preferably focused (or unfocused, as the case may be) to provide a large spot 60 (relative to spot 62), so that the energy per unit volume applied by beam 61 to preheat this portion of the powder is less than that applied by laser 110 in forming interior article portion 52 itself. The energy applied by beam 61 is preferably selected so as to heat powder 50 and the edge of interior article portion 52 to a temperature near but below the sintering temperature of the material. As a result of this preheating, the incremental additional power applied by beam 63 to form skin 54 may be minimized, thus reducing thermal gradients in powder layer 50 in producing skin 54. In this example, either two lasers 110 or a laser-splitting system would be used to simultaneously generate the two laser beams 61, 63.

Alternatively, depending upon the thermal conduction of powder 50, it is contemplated that the preheating of process 16 may be performed in advance of the skin formation of process 18. In this example, the same laser 110 may perform the preheating of process 16 as used to form interior article portions 52 and skin 54, such preheating occurring in a separate vector pass around the perimeter of interior articles 52, such as with a defocused beam 61 as shown in FIG. 4. According to this example of the invention, however, the thermal conduction in the layer must be sufficiently low as to allow the localized preheating performed in process 16 to remain until laser 110 returns, in focused form, to fabricate skin 54.

Further alternative techniques for using laser energy to perform preheating process 16 are described in U.S. Pat. No. 5,393,482, issued Feb. 28, 1995 and incorporated herein by this reference.

Still further in the alternative, preheating process 16 may be performed in a macroscopic manner, for example through the use of radiant heater 130 controlled by thermal sensors 134, 136 as shown in FIG. 2a, or by the heated downdraft of gas through powder 50. In such macroscopic preheating, however, it is important to ensure that the temperature of the next powder layer being dispensed is maintained below the caking temperature, of course.

Following skin formation process 18, decision 19 is performed by computer 140 to determine if additional layers in the article remain to be performed. If so, selective laser sintering process 10 continues in a layerwise fashion, repeating each of processes 12, 14, 16 and 18 for additional layers of the article being formed. For example, referring back to FIG. 2a, the dispensation of an additional layer of powder is performed by part piston 106 dropping by a specified distance, followed by the dispensation of powder from feed piston 114 via counter-rotating roller 118 as before. The selective laser sintering of the article is performed in the next layer, typically with a different cross-section from that in the previous layer to form the article of the desired shape.

Figure 3C:
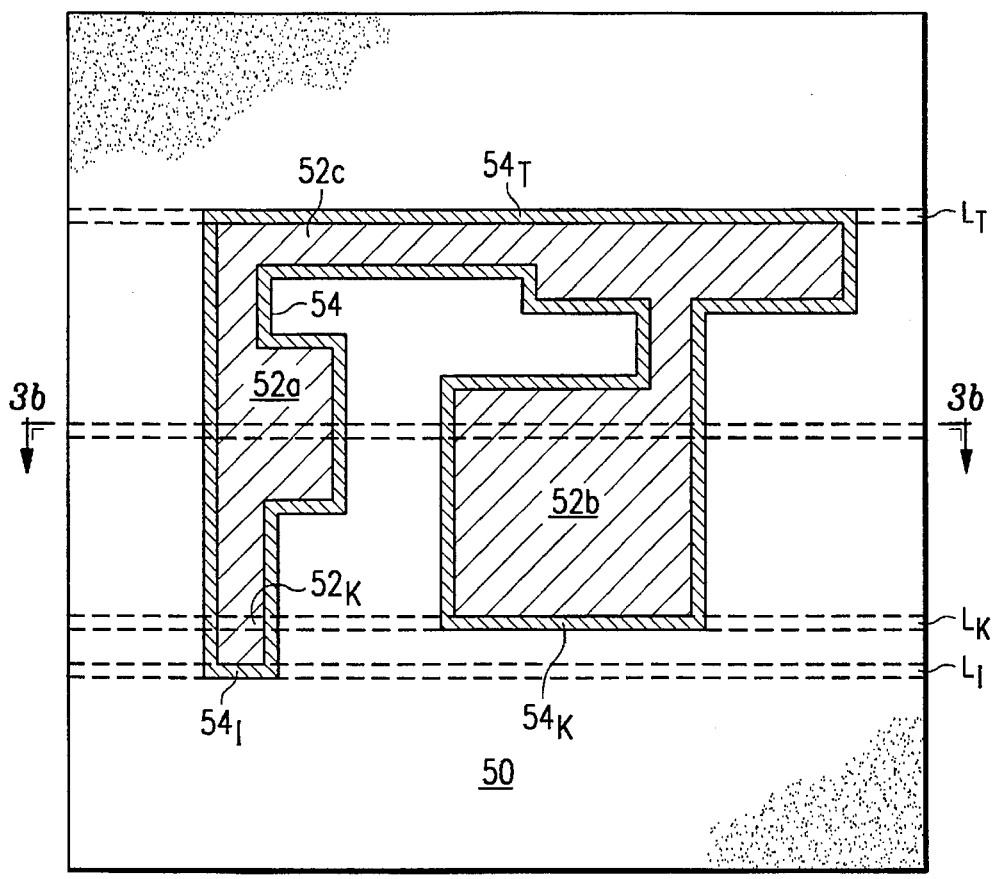

Selective laser sintering process 10, through its repetitive layerwise processing, thus results in interior article 52 being surrounded on all sides by skin 54, as shown in the vertical cross-section in FIG. 3c. As shown in FIG. 3c, the shape of article 52 may be quite complex, including overhanging portions such as portion 52c which connects portions 52a, 52b (in FIG. 3b); in this example, portion 52c is formed after portions 52a, 52b connected thereby. Selective laser sintering process 10 thus enables the formation of highly complex articles with gas-impervious skins, or cans, surrounding the article.

As shown in FIG. 3c, article 52 is formed in such a manner as to be fully surrounded by unfused powder layers 50, on the sides, bottom and top thereof. In this arrangement, some of the layers formed in selective laser sintering process 10 may have substantial skin portions 54 formed therein. For example, layer $L_1$, which is the first layer having solidified portions, has only a skin portion 542 formed therein. Layer $L_K$ has only a small interior article portion $52_K$ but a large skin portion $54_K$ therein. Top layer $L_T$ has only a large skin portion $54_T$ formed therein. The formation of these relatively large skin surfaces 54 must be taken into account in the operation of selective laser sintering system 100. The cumulative effect of the contiguous skin surfaces 54 is to provide a gas-impervious "can" around article 52, for use in subsequent hot isostatic pressing.

If decision 19 determines that no more layers are to be processed in the formation of article 52 and skin 54, process 20 is then performed, by way of which article 52 and skin 54 are removed from the unfused powder 50. This process is conventional in the field of selective laser sintering, and is commonly referred to as "rough break-out". Process 20 is typically performed by removing part bed 107 from system 100, transferring the entire mass of the article and powder to a different workstation, and then mechanically removing unfused powder 50 from around article 52 and skin 54. Unused powder 50 may be retained and re-used in subsequent build operations.

Figure 5:
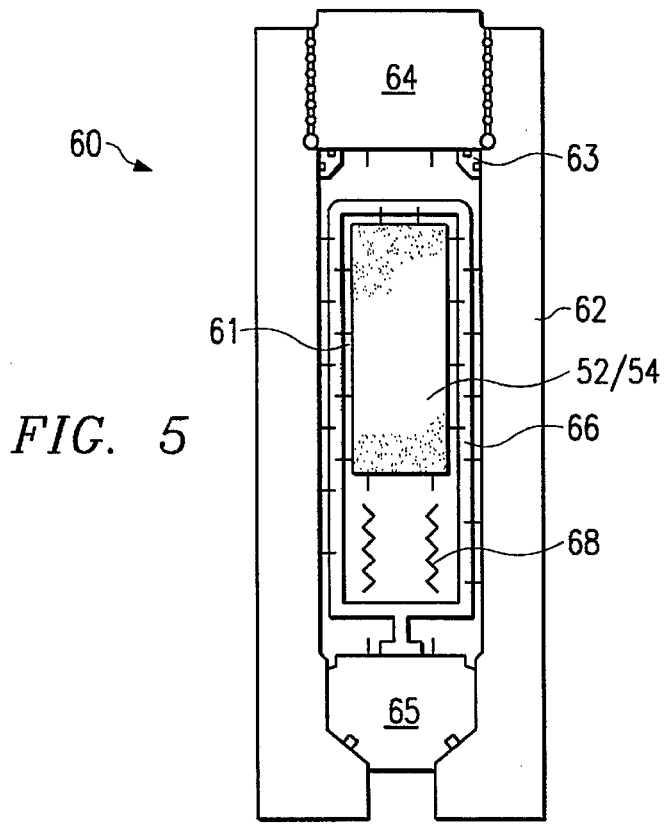
FIG. 5 is a cross-sectional view of a HIP system as useful in processing the article according to the preferred embodiment of the invention.

Following the rough break-out of process 20, article 52 and skin 54 are subjected to hot isostatic pressing (HIP) process 30. HIP process 30 is performed in the manner conventional in the art, by placing article 52 and skin 54 into a pressure vessel within a furnace, to fully densify the metal article. FIG. 5 illustrates HIP system 60, which is an example of the processing chamber useful in performing process 30 according to this embodiment of the invention. HIP system 60 includes cylindrical body 62, through a top opening of which a workpiece of article 52 surrounded by skin 54 (shown as a cylinder in this view, but which will of course have the shape formed by selective laser sintering process 10) is placed into chamber 61. Bottom closure 65 remains in place within body 62; top closure 64 is placed into its corresponding opening to confine the workpiece within body 62, with seal 63 allowing pressure to be maintained in chamber 61. HIP system 60 further includes heating element 68 which, together with thermal barrier 66, heats chamber 61 during the HIP process.

Process 30 is performed by heating and pressurizing chamber 61 within HIP system 60, with the pressurizing performed with an inert gas, such as argon or helium, that is injected into chamber 61 of HIP system 60. Typical temperatures of HIP processing are on the order of 500° C. to 2000° C., and pressures range from vacuum to 200 MPa; the particular temperatures and pressures used will, as is conventional in the art, depend upon the material of article 52 undergoing the HIP process. For example, an article formed of a bronze/nickel mixture may be subjected to a temperature of on the order of 750° to 900° C. and a pressure of on the order of 125 MPa for one to three hours. As is also well known in the HIP field, the temperature tolerances are typically quite small for most materials, as provided by conventional HIP processing chambers.

As a result of process 30, the high pressure gas in chamber 61 imparts an isostatic force in an isotropic manner around skin 54. Since skin 54 is impervious to gas, however, the force imparted by the pressurized gas squeezes the outer surfaces of skin 54. Since the temperature within chamber 61 is raised to the softening temperature of the material of skin 54 and article 52, however, this force of the pressurized gas densifies article 52. After subjection of article 52 and skin 54 to this temperature and pressure condition for the appropriate duration, a fully dense metal article is provided. The HIP "can" of skin 54 may, at this point, be removed from article 52 by machining. Alternatively, since skin 54 was formed of the same material as article 52, which is now densified via HIP process 30, skin 54 may be allowed to remain at the surface of article 52 to become part thereof. Finishing techniques may then be applied to the exterior surface of article 52, or of skin 54, as the case may be.

While some amount of shrinkage will occur in the densification of HIP process 30, it is contemplated that this shrinkage will be relatively small, particularly when selective laser sintering process 10 forms interior article 52 to be near-fully dense. The shrinkage may be taken into account in the CAD data base representation used in selective laser sintering process 10.

This embodiment of the invention thus provides a fully dense three-dimensional article, such as a prototype part or a mold die, which may be fabricated of metal to have complex shapes and small feature sizes and resolution. The use of selective laser sintering in the fabrication of the article provide direct CAD-to-article translation, in short build times, while the use of HIP densification processing allows the selective laser sintering process to be performed at minimal power levels, thus reducing the vulnerability of the process to thermal distortion. The decoupling of the thermal gradient problems from the metal materials used thus serves to widen the range of metal materials which may be processed according to the preferred embodiment of the invention.

Referring back to FIG. 3c, it has been observed that layers such as $L_1$, $L_K$, $L_T$, may, in some circumstances, be vulnerable to thermal distortion, due to the relatively large areas of skin 54 formed therein. The primary thermal distortion mechanism for such large surfaces is referred to as "curl", as the distortion is due to surface tension of the heavily sintered region, upon cooling.

Figure 6:
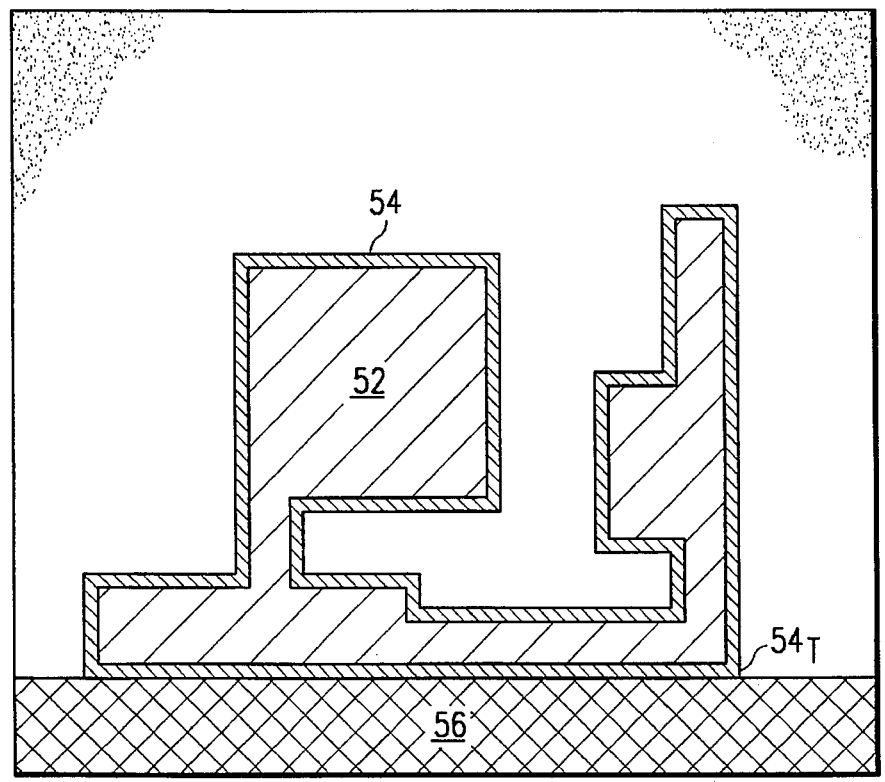

Referring now to FIGS. 6 and 7, alternative embodiments of the invention are illustrated which may be used to alleviate thermal distortion of relatively large flat skin surfaces. FIG. 6 illustrates, in vertical cross-section as in the case of FIG. 3c, article 52 with skin 54 formed thereupon, having similar shape and dimensions as article 52 in FIG. 3c. In this embodiment, however, substrate 56 is provided within part piston 106, upon which skin layer $54_T$ and article 52 is formed by selective laser sintering process 10. As is evident from FIG. 6, article 52 is oriented upside-down relative to FIG. 3c, as such orientation allows the largest planar skin layer $54_T$ to be in place upon substrate 56, as the largest surface is most susceptible to curl. Adhesion of skin layer $54_T$ to substrate 56 occurs during the sintering of that layer; this adhesion will tend to counteract the effects of surface tension in cooling, reducing the curl distortion thereof. Substrate 56 thus must be formed of a material that is compatible with the metal of the powder, and may for example be the same material as the powder. The article will be removed from substrate 56 prior to HIP process 30. FIG. 7 illustrates another embodiment of the invention, in which substrate 56 serves as part of the "can", together with the remainder of skin 54, eliminating the large skin surface $54_T$; in this embodiment of the invention, however, substrate 56 must be of a gas impervious material, as it will constitute part of the "can" around the article in HIP process 30. Each of these alternative embodiments thus serve to reduce thermal distortion in the eventual article.

Referring now to FIGS. 8 and 9, a process of fabricating an article according to another alternative embodiment of the invention will now be described. According to this alternative embodiment of the invention, a laser directed process is provided to form a can for the article to be produced, within which a sinterable powder may then be dispensed which will become the article.

Referring to FIG. 8, the process according to this embodiment of the invention begins with process 70, in which a can 72 is formed by way of laser generation. FIG. 9 schematically illustrates laser generation system 71 which includes powder dispensing system 76 and laser 78; of course, these subsystems are contained within a chamber (not shown) so that atmospheric and temperature control may be effected, similarly as described above relative to selective laser sintering system 100. As described in the above-referenced article by Klocke, et al., "Rapid Metal Prototyping and Tooling", *EARP-Newsletter*, Vol. 6, (July 1995), laser generation refers to a process of forming an article by dispensing powder into a location at which a laser beam is focused; the powder fuses to previously formed portions of the article at that location, so that the article is built up over time. This operation is shown in FIG. 9, by the operation of a beam from laser 78 solidifying powder 75 being dispensed by powder dispensing system 76 at point P. Laser 78 will move its focused point P along the edge of can 72, building up the article as it travels. Of course, the direction in which laser 78 scans along the previously built-up portions of can 72 may vary, depending upon the particular circumstances and the shape thereof.

Process 80 is then performed which, in this embodiment of the invention, involves filling can 72 with a metal powder, preferably of the same material as that used to form can 72. In contrast to the first embodiment of the invention described hereinabove, the powder placed into can 72 is not densified prior to its placement into can 72, as such densification would limit its ability to fill any complex portions of can 72. Can 72 is then sealed, for example by way of laser sintering a top surface of powder dispensed therein using laser 78, or by attaching a metal surface thereover, as desired. The process according to this embodiment of the invention is then completed by subjecting can 72 containing metal powder to hot isostatic pressing, in process 90, carried out in the manner described hereinabove. Can 72 may then be removed from the article, or may be left in place as part of the finished product, as desired.

According to this alternative embodiment of the invention, similarly as in the first embodiment described hereinabove, the use of a directed laser beam to define the geometry and shape of the article to undergo HIP processing allows for complex part formation and high resolution construction, directly from a CAD representation of the article. The close fit and material compatibility of the can to the interior material also ensures that the shrinkage of the article through HIP processing is minimized, thus further improving the structural accuracy of the finished product.

Further in the alternative, one may use the selective laser sintering process as described hereinabove to form only a gas-impervious skin, leaving powder therewithin in an unfused state prior to HIP processing. Alternatively, the skin formed by selective laser sintering may be emptied after its fabrication, and refilled with an unfused powder of a different material prior to HIP processing. In either of these alternative approaches, the HIP processing will densify the unfused powder within the gas-impervious skin to form a dense metal article in the manner described hereinabove.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of fabricating a three-dimensional metal article, comprising the steps of:

dispensing a layer of metal powder at a target surface;

fusing selected locations of the layer of metal powder;

directing an energy beam to fuse metal powder at perimeter locations of the selected locations of the layer of metal powder, to form a portion of a gas-impervious skin thereat;

repeating the dispensing, fusing, and directing steps for a plurality of layers, with fused locations of successive layers fusing to fused locations of immediately prior layers to form an interior portion of the article within a gas-impervious skin; and densifying the interior portion of the article by subjecting the combination of the interior portion of the article and the skin to an elevated temperature and elevated pressure.

2. The method of claim 1, wherein the fusing step comprises:

directing an energy beam at selected locations of the layer of metal powder to fuse the powder thereat.

3. The method of claim 2, wherein the steps of directing an energy beam direct a laser beam at the metal powder.

4. The method of claim 3, wherein the step of directing a laser beam to fuse metal powder at perimeter locations of the article directs more energy to the perimeter locations than does the step of directing a laser beam at selected locations of the layer of metal powder.

5. The method of claim 4, wherein the step of directing a laser beam to fuse metal powder at perimeter locations of the article comprises:

preheating metal powder at the perimeter locations; and directing a laser beam at the preheated metal powder at the perimeter locations to fuse the powder thereat.

6. The method of claim 5, wherein the preheating step comprises:

heating the metal powder at the target surface.

7. The method of claim 5, wherein the preheating step comprises:

directing a first laser beam along the perimeter locations of the article.

8. The method of claim 7, wherein the first laser beam delivers less energy per unit volume to the article than does the than does the step of directing a laser beam at selected locations of the layer of metal to form the interior portion of the article.

9. The method of claim 1, wherein the step of dispensing a layer of metal powder at a target surface comprises, for a first layer, dispensing a layer of metal powder at a surface of a substrate.

10. The method of claim 9, wherein the step of directing an energy beam to fuse metal powder at perimeter locations of the article to form a gas-impervious skin around the interior portion of the article comprises, for the first layer, directing the energy beam over a selected area of the first layer of powder at the surface of the substrate to form the gas-impervious skin thereat.

11. The method of claim 9, wherein the step of fusing selected locations of the layer of metal powder into a mass comprises fusing a portion of the first layer at the surface of the substrate into a mass, so that the interior portion of the article is in contact with the surface of the substrate.

12. A method of fabricating a three-dimensional metal article, comprising the steps of:

forming a metal powder into an interior portion of the article;

directing an energy beam to fuse metal powder at perimeter locations of the article to form a gas-impervious skin around the interior portion of the article;

densifying the interior portion of the article by subjecting the combination of the interior portion of the article and the skin to an elevated temperature and elevated pressure; and removing the skin from the article after the densifying step.

13. A method of fabricating a three-dimensional metal article, comprising the steps of:

directing an energy beam to fuse a metal powder at perimeter locations of the article to be formed, to form a gas-impervious skin thereat;

filling the gas-impervious skin with a metal powder to form an interior portion of the article within the skin; and densifying the interior portion of the article by subjecting the combination of the interior portion of the article and the skin to an elevated temperature and elevated pressure.

14. The method of claim 1, wherein the metal powder comprises a metal alloy.

15. The method of claim 1, wherein the metal powder comprises a steel powder.

16. The method of claim 1, wherein the metal powder comprises a mixture of a plurality of metal powders.

17. The method of claim 12, wherein the metal powder comprises a metal alloy.

18. The method of claim 12, wherein the metal powder comprises a steel powder.

19. The method of claim 12, wherein the metal powder comprises a mixture of a plurality of metal powders.

20. The method of claim 13, wherein the metal powder comprises a metal alloy.

21. The method of claim 13, wherein the metal powder comprises a steel powder.

22. The method of claim 13, wherein the metal powder comprises a mixture of a plurality of metal powders.

* * * * *